(12) United States Patent
Knuth

(10) Patent No.: US 11,080,429 B2
(45) Date of Patent: Aug. 3, 2021

(54) SAFETY CIRCUIT FOR AN ELEVATOR SYSTEM, DEVICE AND METHOD OF UPDATING SUCH A SAFETY CIRCUIT

(71) Applicant: Otis Elevator Company, Farmington, CT (US)

(72) Inventor: Sven Knuth, Berlin (DE)

(73) Assignee: OTIS ELEVATOR COMPANY, Farmington, CT (US)

(*) Notice: Subject to any disclaimer, the term of this patent is extended or adjusted under 35 U.S.C. 154(b) by 344 days.

(21) Appl. No.: 16/281,691

(22) Filed: Feb. 21, 2019

(65) Prior Publication Data
US 2019/0268168 A1    Aug. 29, 2019

(30) Foreign Application Priority Data

Feb. 23, 2018 (EP) .................................. 18158447

(51) Int. Cl.
*G06F 21/64* (2013.01)
*B66B 1/34* (2006.01)
(Continued)

(52) U.S. Cl.
CPC ............ *G06F 21/64* (2013.01); *B66B 1/3461* (2013.01); *B66B 5/00* (2013.01); *B66B 13/22* (2013.01); *G06F 21/33* (2013.01); *H04L 9/006* (2013.01); *H04L 9/0891* (2013.01); *H04L 9/30* (2013.01); *H04L 9/3268* (2013.01); *H04L 63/0442* (2013.01); *H04L 63/0823* (2013.01)

(58) Field of Classification Search
CPC .................................................... G06F 21/64
See application file for complete search history.

(56) References Cited

U.S. PATENT DOCUMENTS

| 4,661,658 A | 4/1987 | Matyas |
|---|---|---|
| 7,496,756 B2 | 2/2009 | Oka et al. |

(Continued)

FOREIGN PATENT DOCUMENTS

| CN | 103413159 A | 11/2013 |
|---|---|---|
| CN | 105905718 A | 8/2016 |

(Continued)

OTHER PUBLICATIONS

Chinese Office Action and Search Report for application 2019101320071, dated Jun. 1, 2020, 8 pages.

(Continued)

*Primary Examiner* — Bradley W Holder
(74) *Attorney, Agent, or Firm* — Cantor Colburn LLP

(57) ABSTRACT

A method of updating at least one security certificate of a safety circuit of an elevator system includes: connecting the safety circuit with a communicator which is capable to communicate with a certification server; sending from the communicator to the safety circuit a security certificate update request for updating at least one security certificate stored within the safety circuit; the safety circuit sending a public key of a safety circuit security certificate associated with the safety circuit via the communicator to the certification server; the certification server checking whether the safety circuit security certificate associated with the received public key is included in a data base of known security certificates and not marked as compromised.

13 Claims, 6 Drawing Sheets

Figure 1:
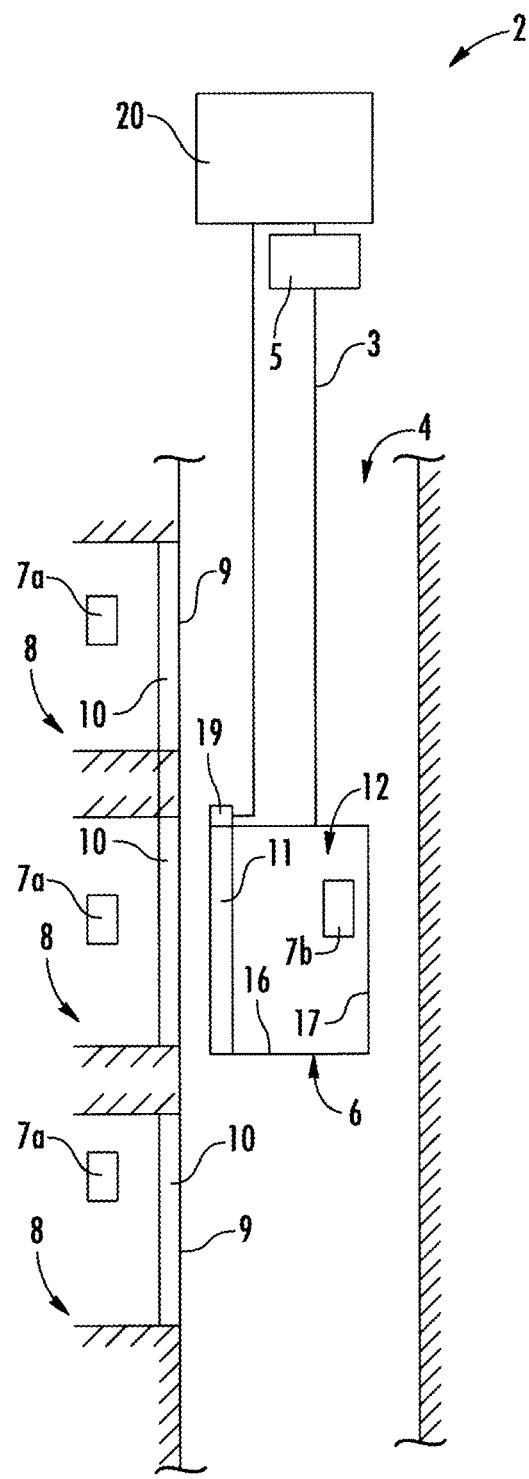

(51) Int. Cl.
*B66B 5/00* (2006.01)
*H04L 9/30* (2006.01)
*H04L 9/32* (2006.01)
*H04L 29/06* (2006.01)
*H04L 9/00* (2006.01)
*B66B 13/22* (2006.01)
*H04L 9/08* (2006.01)
*G06F 21/33* (2013.01)

(56) References Cited

U.S. PATENT DOCUMENTS

| | | |
|---|---|---|
| 7,707,406 B2 | 4/2010 | Qiu |
| 7,904,568 B2 | 3/2011 | Rudd |
| 7,929,703 B2 | 4/2011 | Bellows et al. |
| 8,045,713 B2 | 10/2011 | Lain et al. |
| 8,046,587 B2 | 10/2011 | Gantman et al. |
| 9,071,446 B2 | 6/2015 | Kreft |
| 9,467,298 B1 | 10/2016 | Alexander et al. |
| 9,467,299 B1 | 10/2016 | Alexander et al. |
| 9,544,301 B2 | 1/2017 | Hintermeister |
| 2005/0069136 A1 | 3/2005 | Thornton et al. |
| 2006/0059548 A1 | 3/2006 | Hildre et al. |
| 2007/0005981 A1* | 1/2007 | Miyazawa ............ H04L 9/3268 713/176 |
| 2013/0268582 A1 | 10/2013 | Sitati et al. |
| 2014/0136839 A1* | 5/2014 | Thayer ................ H04L 63/0823 713/156 |
| 2016/0373263 A1* | 12/2016 | Zaidi .................... H04L 9/3265 |
| 2017/0324567 A1* | 11/2017 | Matsuo ................ H04L 9/0861 |

FOREIGN PATENT DOCUMENTS

| | | |
|---|---|---|
| CN | 106603242 A | 4/2017 |
| JP | 2009023820 A | 2/2009 |
| JP | 2009102150 A | 5/2009 |
| JP | 2009220924 A | 10/2009 |
| WO | 2016177843 A1 | 11/2016 |
| WO | 2016180484 A1 | 11/2016 |

OTHER PUBLICATIONS

European Search Report for application EP 18158447.5, dated Aug. 17, 2018, 7 pages.
TechNet Wiki, "Offline Root Certification Authority (CA)", available at: https://social.technet.microsoft.com/wiki/contents/articles/2900.offline-root-certification-authority-ca.aspx, accessed Feb. 21, 2019, 3 pages.

* cited by examiner

SAFETY CIRCUIT FOR AN ELEVATOR SYSTEM, DEVICE AND METHOD OF UPDATING SUCH A SAFETY CIRCUIT

The invention relates to a safety circuit for an elevator system. It further relates to a method and to a device for updating safety circuits in an elevator system.

Elevator systems, in particular the controllers of elevator systems, usually comprise a plurality of safety related circuits ("safety circuits"), which are essential for operating the respective elevator system safely. For ensuring safe operation of an elevator system, only safety circuits authorized by the vendor of the elevator system may be used. Thus, in order to prevent replacing the original safety circuits by unauthorized third party safety circuits, each safety circuit is provided with a safety circuit security certificate signed with a factory security certificate issued by the vendor. In operation, the safety circuits mutually check their respective security certificates and communicate with each other only in case the other safety circuit is able to identify itself by a safety circuit security certificate signed with a factory security certificate known to all safety circuits of the same vendor. Third party safety circuits are not able to validly identify themselves. In consequence, an elevator system comprising at least one unauthorized third party safety circuit will not operate.

In case the factory security certificate is compromised, for example as it has been become available to the public, it must be replaced by a new factory security certificate. As a result, newly produced safety circuits comprising safety certificates signed with the new factory security certificate will not communicate with previously produced ("old") safety circuits comprising old safety circuit security certificates, which have been signed with the previous factory security certificate, and vice versa. Thus, all safety circuits of an elevator system need to be replaced in case the factory security certificate of at least one safety circuit has been changed. Replacing all safety circuits of an elevator system is time-consuming and expensive.

It therefore would be beneficial to provide a method of updating the safety circuits of an elevator system in order to enable them to communicate with new safety circuits, i.e. with safety circuits comprising safety circuit security certificates signed with a new factory security certificate, without the need of physically replacing the safety circuits.

A method according to an exemplary embodiment of the invention comprises the steps of connecting the safety circuit with a device, which in the following will be called "communicator", the communicator being capable to communicate with a certification server in particular for sending a security certificate update request for updating at least one security certificate stored within the safety circuit from the communicator to the safety circuit. In response to receiving the security certificate update request, the safety circuit sends a public portion ("public key") of a safety circuit security certificate associated with the safety circuit via the communicator to the certification server. The certification server checks whether the safety circuit security certificate associated with the received public key is comprised in a data base of known security certificates and not marked as compromised.

In case the safety circuit security certificate associated with the received public key is included in the data base of known security certificates and not marked as com-promised, the certification server sends at least one new security certificate via the communicator to the safety circuit and the safety circuit installs the at least one new security certificate.

In case the safety circuit security certificate associated with the received public key is not included in the data base of known security certificates and/or in case the received public key is marked as compromised, the certification server sends a message to the communicator indicating that the safety circuit is invalid.

Exemplary embodiments of the invention further comprise a device ("communicator") for updating security certificates stored within safety circuits of an elevator system. A communicator according to an exemplary embodiment of the invention comprises a safety circuit interface configured for exchanging data with a safety circuit of an elevator system and a server interface configured for exchanging data with a certification server. The communicator is configured for establishing a first data connection with the safety circuit of an elevator system via the safety circuit interface; establishing a second data connection with the certification server via the server interface; sending a security certificate update request for updating at least one security certificate stored within the safety circuit to the safety circuit; receiving a public key of the security certificate associated with the safety circuit from the safety circuit and sending the received public key of the safety circuit security certificate to the certification server; and receiving at least one new security certificate from the certification server and sending the received at least one security certificate to the safety circuit; or receiving a message from the certification server that the safety circuit is invalid.

Exemplary embodiments of the invention also include a safety circuit for an elevator system comprising a memory configured for storing at least one security certificate and a communication interface configured for communicating with at least one external communicator. The safety circuit is configured for establishing a data connection with the external communicator; receiving a security certificate update request for updating the at least one security certificate; sending a public key of a safety circuit security certificate associated with the safety circuit to the external communicator; receiving at least one new security certificate from the external communicator; and replacing the at least one security certificate stored in the memory by the at least one new security certificate received from the external communicator.

Exemplary embodiments of the invention also include a controller for an elevator system comprising at least two safety circuits according to exemplary embodiments of the invention. Exemplary embodiments of the invention further include an elevator system comprising such a controller.

Exemplary embodiments of the invention allow replacing the safety circuit security certificates and the factory security certificates of the safety circuits comprised in a controller of an elevator system without physically replacing the safety circuits themselves. In case one or more safety circuits of a controller of an elevator sys-tem are replaced by new safety circuits comprising new security certificates signed with a new factory security certificate, the security certificates of the other (non-re-placed) safety circuits may be updated without physically replacing said other security circuits. In consequence, the maintenance and repair of the elevator system are facilitated and the costs are reduced as there is no need to replace all security circuits.

A number of optional features are set out in the following. These features may be realized in particular embodiments, alone or in combination with any of the other features.

In order to prevent an unauthorized update of the security certificates, a safety circuit receiving a security certificate update request may check whether the security certificate update request is valid before sending the public key of its safety circuit security certificate. The check in particular may include checking whether the security certificate update request is signed with a valid security certificate. The security certificate update request may be signed with the private key of the old safety circuit security certificate, the old factory security certificate, or a root security certificate of the vendor.

The at least one new security certificate sent from the certification server to the safety circuit may include at least two security certificates, in particular a factory security certificate and a safety circuit security certificate associated with the individual security circuit and signed with the factory security certificate. The factory security certificate reliably certifies all safety circuit security certificates as being authorized by the vendor. Each safety circuit security certificate is associated with a single security device unambiguously identifying said security device.

The new security certificates sent from the certification server to the safety circuit may replace corresponding old security certificates stored within the safety circuit for updating the security certificates stored within the respective safety circuit. This in particular allows updating the security certificates of all security circuits of a controller, e.g. in case a factory security certificate has been compromised and there-fore no longer provides the required security.

All factory security certificates may be signed with a common root security certificate of the vendor in order to allow the security circuits to reliable identify valid factory security certificates. The private key of the root security certificate needs to be protected and kept secret under all circumstances.

The security certificate update request may be signed with the common root security certificate as well, in order to allow the safety circuit to identify the security certificate update request as a valid security certificate update request.

The communication between the safety circuit and the communicator and/or the communication between the communicator and the certification server may be encrypted for ensuring the integrity of the data transmitted via said data connections. The data connections in particular may be encrypted employing an asymmetric encryption method using a public key and a private key providing a reliable encryption which is not easy to break.

The communicator may be configured for indicating whether the safety circuit is valid or not, e.g. via a display of the communicator. As a result, a mechanic using the communicator knows whether the certificates of the safety circuit will be up-dated or whether the safety circuit must be replaced as it is considered as being invalid.

The communicator may be a handheld device carried by a mechanic visiting the elevator system for repair and/or maintenance.

The server interface of the communicator may be configured for establishing a wired or wireless data connection with the certification server, and the safety circuit interface may be configured for establishing a wired or wireless data connection with the safety circuit. A wired data connection, which may be established e.g. by a plug-and-socket connection, is very safe, as it is difficult to compromise. A wireless data connection is very convenient as it is easy to establish and does not restrict the movements of the communicator and a mechanic using the communicator.

A wireless data connection may be established via WLAN, Bluetooth®, or a similar technology in particular including GSM, UMTS, LTE etc.

In the following an exemplary embodiment of the invention is described with reference to the enclosed figures.

FIG. 1 schematically depicts an elevator system comprising an elevator car ac-cording to an exemplary embodiment of the invention.

FIGS. 2 to 5 schematically depict a controller comprising a plurality of safety circuits.

Figure 6:
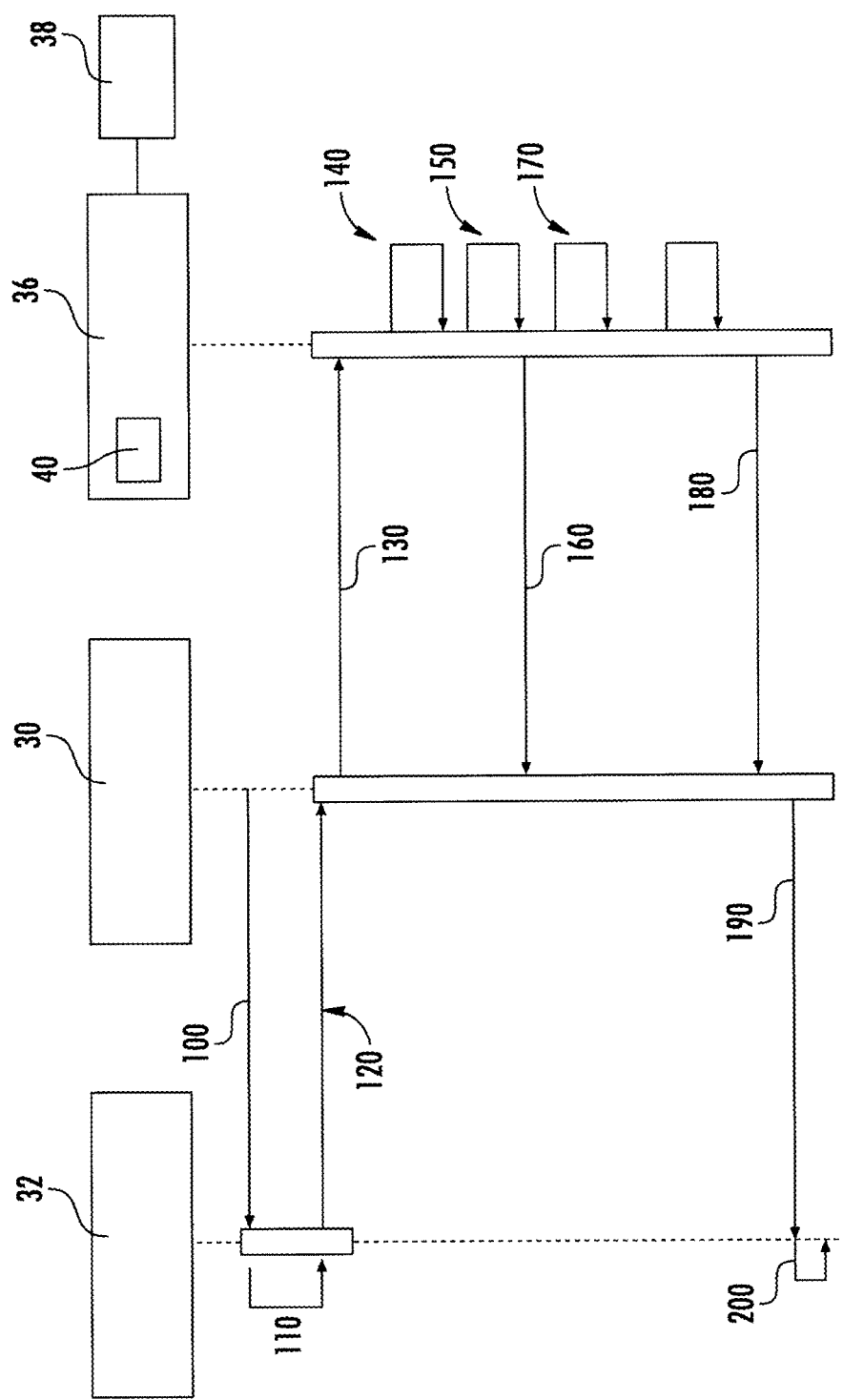

FIG. 6 is a schematic sequence diagram of a method for updating security certificates stored within a safety circuit of an elevator system.

FIG. 1 schematically depicts an elevator system 2 comprising an elevator car 6 according to an exemplary embodiment of the invention.

The elevator system 2 comprises a hoistway 4 extending in a longitudinal direction between a plurality of landings 8 located on different floors.

The elevator car 6 comprises a floor 16 and sidewalls 17 extending from the floor 16 and defining an interior space 12 of the elevator car 6. Only one sidewall 17 is depicted in the schematic illustration of FIG. 1.

The elevator car 6 is movably suspended within the hoistway 4 by means of a tension member 3. The tension member 3, for example a rope or belt, is connected to a drive 5, which is configured for driving the tension member 3 in order to move the elevator car 6 along the longitudinal direction I height of the hoistway 4 between the plurality of landings 8.

Each landing 8 is provided with a landing door (elevator hoistway door) 10, and the elevator car 6 is provided with a corresponding elevator car door 11 allowing passengers to transfer between a landing 8 and the interior space 12 of the elevator car 6 when the elevator car 6 is positioned at the respective landing 8.

The exemplary embodiment of the elevator system 2 shown in FIG. 1 employs a 1:1 roping for suspending the elevator car 6. The skilled person, however, easily understands that the type of the roping is not essential for the invention and that different kinds of roping, e.g. a 2:1 roping, may be used as well. The elevator system 2 may further include a counterweight (not shown) moving concurrently and in opposite direction with respect to the elevator car 6. Alternatively, the elevator system 2 may be an elevator system 2 without a counterweight, as it is shown in FIG. 1. The drive 5 may be any form of drive used in the art, e.g. a traction drive, a hydraulic drive or a linear drive. The elevator system 2 may have a machine room or may be a machine room-less elevator system. The elevator system 2 may use a tension member 3, as it is shown in FIG. 1, or it may be an elevator system with-out a tension member 3, comprising e.g. a hydraulic drive or a linear drive (not shown).

The drive 5 is controlled by a controller 20 for moving the elevator car 6 along the hoistway 4 between the different landings 8.

Input to the controller 20 may be provided via landing control panels 7a, which are provided on each landing 8 close to the elevator landing doors 10, and/or via a car operation panel 7b provided inside the elevator car 6.

The landing control panels 7a and the car operation panel 7b may be connected to the controller 20 by means of electrical lines, which are not shown in FIG. 1, in particular by an electric bus, e.g. a field bus such as a CAN bus, or by means of wireless data connections.

In order to determine the current position of the elevator car 6, the elevator car 6 is provided with a position sensor 19. The position sensor 19 may be arranged at the top of the elevator car 6 as shown in FIG. 1. Alternatively, the position sensor 19 may be provided at a side of the elevator car 6 or at the bottom, e.g. below a floor 16, of the elevator car 6.

Figure 2:
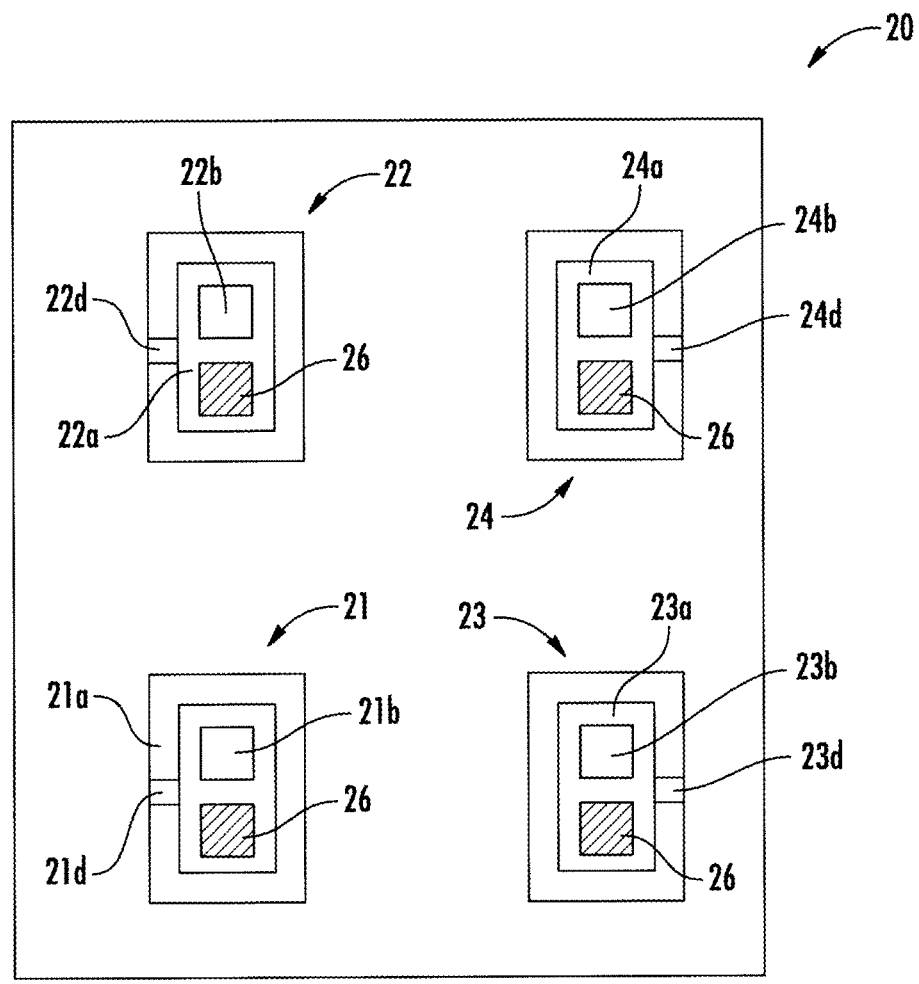

FIG. 2 depicts an enlarged schematic view of the controller 20 of the elevator system 2. The controller 20 comprises a plurality of safety circuits 21, 22, 23, 24 respectively comprising a memory 21a, 22a, 23a, 24a.

An individual safety circuit security certificate 21b, 22b, 23b, 24b is stored in each memory 21a, 22a, 23a, 24a. Each safety circuit security certificate 21b, 22b, 23b, 24b comprises a public part ("public key") and a private part ("private key"). Each safety circuit security certificate 21b, 22b, 23b, 24b is assigned to and unambiguously identifies the respective safety circuit 21, 22, 23, 24.

Further, a public key of a factory security certificate 26 is stored in each memory 21a, 22a, 23a, 24a. The individual safety circuit security certificates 21b, 22b, 23b, 24b are signed with the private key of the factory security certificate 26, which is not available to the public but only to the vendor.

Thus, when communicating with each other, the safety circuits 21, 22, 23, 24 may identify each other as being authorized by the vendor by exchanging their safety circuit security certificates 21b, 22b, 23b, 24b and checking whether the security certificates 21b, 22b, 23b, 24b of the other safety circuits 21, 22, 23, 24 are signed with the same factory security certificate 26.

In case a security device 21, 22, 23, 24 is not able to present a properly signed safety circuit security certificate 21b, 22b, 23b, 24b, the communication between the security devices 21, 22, 23, 24 is stopped, and the operation of the elevator 2 system is stopped or not even started.

As a result, a safe operation of the controller 20 employing only safety circuits 21, 22, 23, 24 authorized and certified by the vendor is guaranteed.

Figure 3:
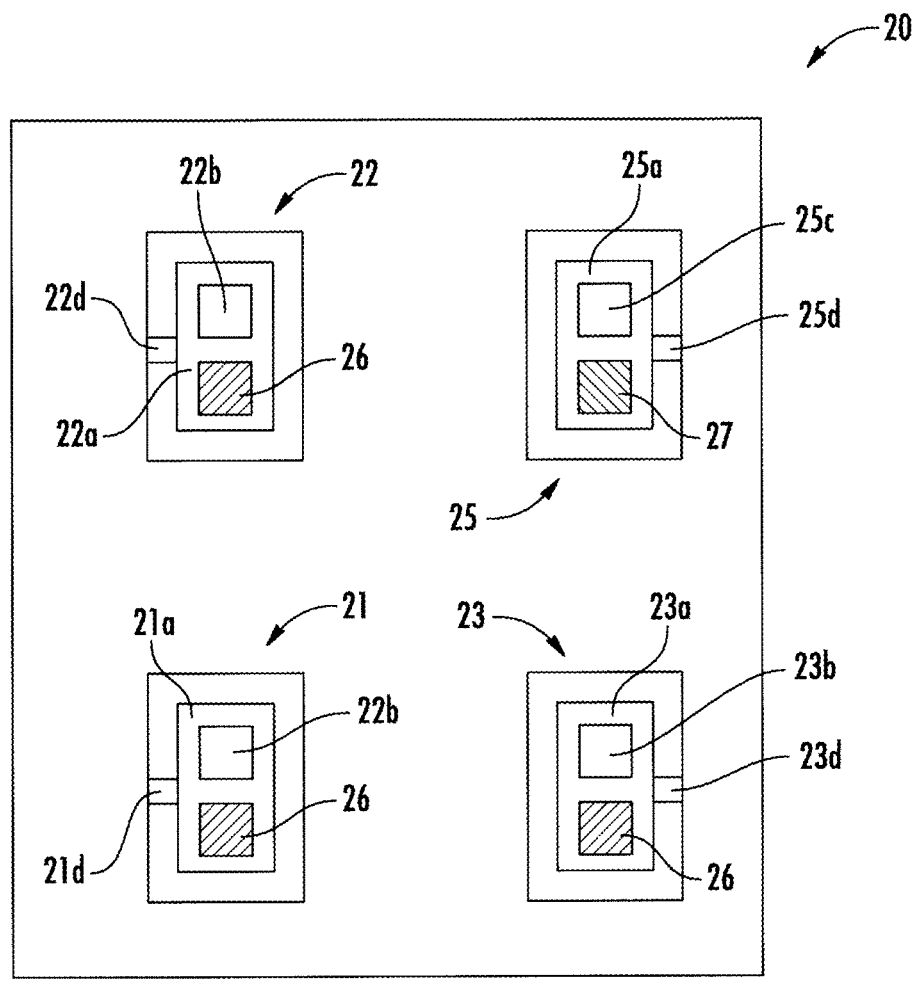

FIG. 3 depicts a situation in which one of the safety circuits 24 has been replaced by a new safety circuit 25 comprising a safety circuit security certificate 25c, which is signed with a new factory security certificate 27. The new factory security certificate 27 is not compatible with the previously used "old" factory security certificate 26, and thus the new safety circuit 25 will not be able to communicate with the previously installed "old" safety circuits 21, 22, 23.

Figure 4:
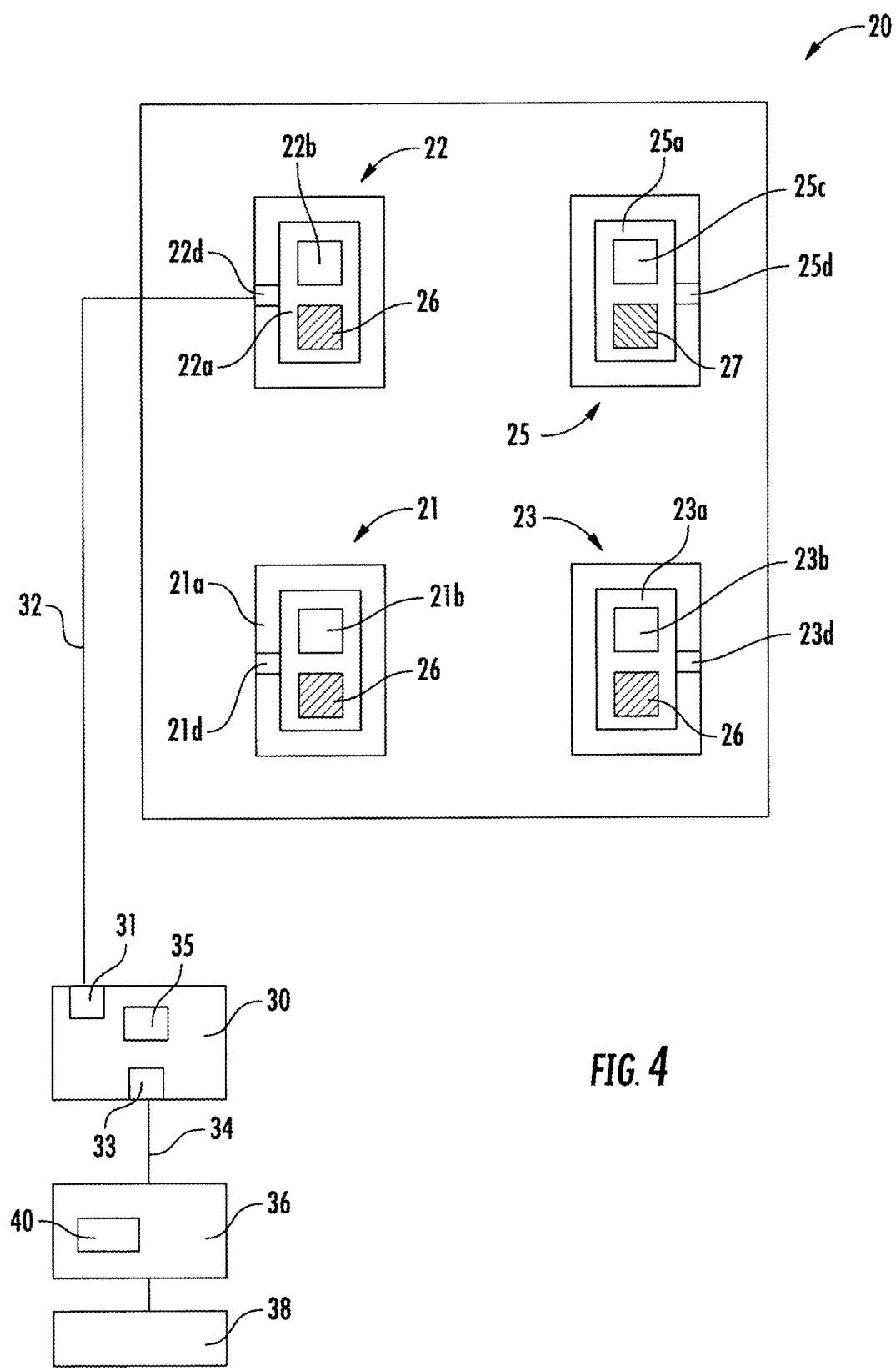

Instead of also replacing the "old" safety circuits 21, 22, 23, by new safety circuits comprising new security certificates, a communicator 30, which e.g. may be a handheld device carried by a mechanic, establishes via a safety circuit interface 31 a first data connection 32 with the controller 20, in particular with a communication interface 21d, 22d, 23d of at least one of the "old" safety circuits 21, 22, 23 (see FIG. 4).

This first data connection 32 may be a wired data connection, which e.g. is established by plug-and-socket connection, or a wireless data connection, which is established via WLAN, Bluetooth®, or a similar technology.

The communicator 30 further establishes via a server interface 33 a second data connection 34 with a certification server 36 provided by the vendor. Said second data connection 34 may be established using the Internet, DSL, WLAN, or any other wireless data connection, such as GSM, UMTS, LTE etc.

The first and the second data connections 32, 34 may be encrypted for ensuring the integrity of the data transmitted via said data connections 32, 34. The data connections 32, 34 in particular may be encrypted employing an asymmetric encryption method using a pair of keys including a public key and a private key.

In an alternative configuration, the certification server 36 may be integrated with the communicator 30, so that the second connection 34 is obsolete or realized within an integrated communication and certification device providing the functions of the communicator 30 and of the certification server 36 by a single device.

The process of updating the safety certificates 21b, 22b, 23b is illustrated in the sequence diagram depicted in FIG. 6 and will be described in the following with reference to FIGS. 4 to 6.

Figure 5:
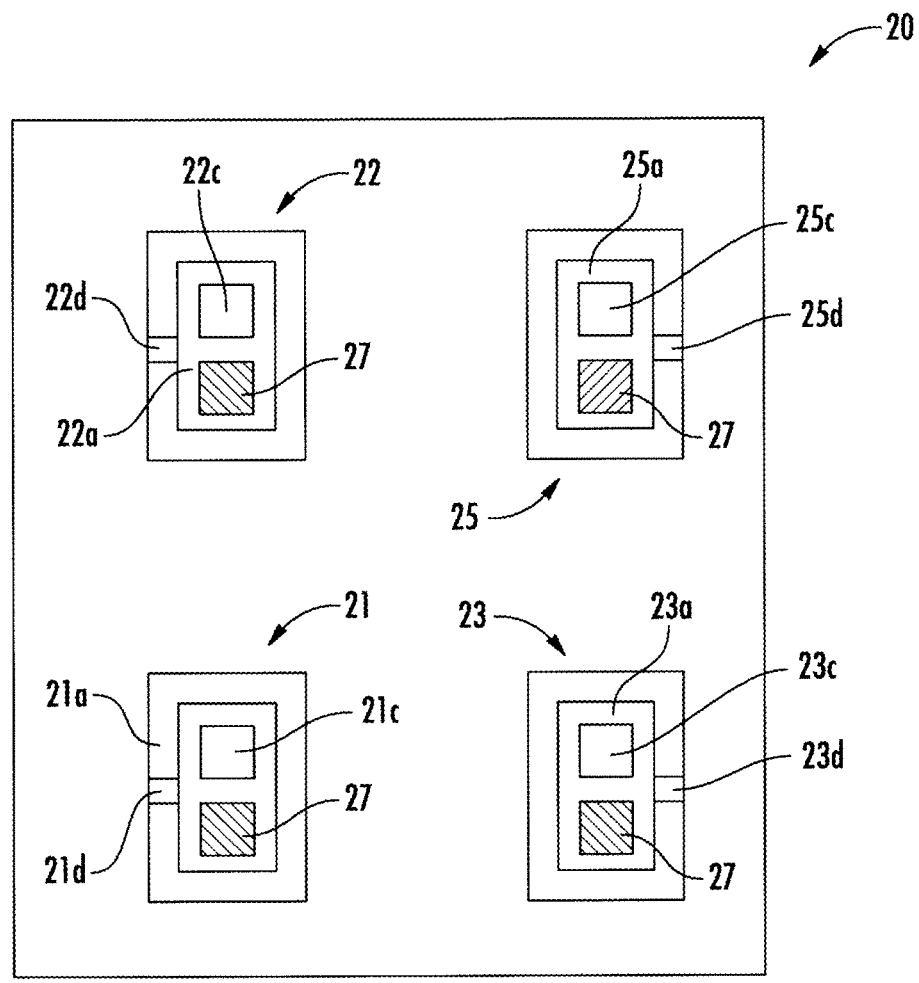

After the first data connection 32 has been established, the communicator 30 sends a request for updating at least one security certificate 22b, 26 stored within the safety circuit 22 ("security certificate update request") to the safety circuit 22 (step 100 in FIG. 5).

Upon receiving said security certificate update request, the safety circuit 22 checks whether the security certificate update request is valid, in particular by checking whether the security certificate update request is signed with a valid security certificate 22b, 26, 40 (step 110). Said valid security certificate 22b, 26, 40 in particular may be the old safety circuit security certificate 22b, the old factory security certificate 26 or a root security certificate 40 of the vendor.

In case the security certificate update request has been confirmed as being valid, the safety circuit 22 responds to the security certificate update request by sending the public key of its own safety circuit security certificate 22b to the communicator 30 (step 120), which forwards it to the certification server 36 (step 130).

The certification sever 36 comprises, or has access to, a database 38 maintained by the vendor comprising data about all safety circuits 21, 22, 23, 24 authorized by the vendor. Thus, based on the received public key of the safety circuit security certificate 22b, the certification server 36 is able to check whether the safety circuit 22 has been authorized by the vendor (step 140).

In addition to the public key of the safety circuit security certificate 22b, the communicator 30 may transfer additional information, in particular information identifying the specific elevator system 2, in order to allow the certification sever 36 to check whether the safety circuit 22 has been authorized for being used within said specific elevator system 2. This reliably prevents that a safety circuit 21, 22, 23, 24 is copied and/or that a safety circuit 21, 22, 23, 24, which has been authorized for a specific region, e.g. Europe, is used in another region such as America or Asia.

The certification sever 36 may further check whether the safety certificate 22b pro-vided by the safety circuit 22 is still valid, or whether it has been marked as com-promised for any reasons.

In case the safety circuit security certificate 22b of the safety circuit 22 is determined as not included in the data base of known security certificates and/or marked as compromised (step 150), the certification sever 36 sends a message to the communicator 30 indicating that the safety circuit 22 is invalid and may not be updated (step 160). Said information may be displayed on a display 35 of the communicator 40. When the safety circuit 22 is invalid, the safety circuit 22 has to be replaced physically by a new, authorized safety circuit.

In case the safety circuit security certificate 22b of the safety circuit 22 is included in the data base 38 of known and valid security certificates 21b, 22b, 23b, 24b, and not marked as compromised, the certification sever 36 (step 170) sends the new factory security certificate 27 and a new safety circuit security certificate 22c, which is specifically assigned to the safety circuit 22 and signed with the new factory security certificate 27 via the communicator 30 to the safety circuit 22 (steps 180, 190).

The new factory security certificate 27 is signed with the root security certificate 40 of the vendor. The safety circuit 22 therefore accepts the new certificates 22c, 27 and replaces the old certificates 22b, 26 by the new certificates 22c, 27 (step 200).

This procedure is repeated for all "old" safety circuits 21, 23 of the controller 20.

As a result, which is illustrated in FIG. 5, all safety circuits 21, 22, 23, 25 comprise the new factory security certificate 27 and a safety circuit security certificate 21c, 22c, 23c, 25c signed with the new factory security certificate 27, respectively. In consequence, all safety circuits 21, 22, 23, 25 are able to identify themselves as being authorized by the vendor to the other safety circuits 21, 22, 23, 25. Thus, the safety circuits 21, 22, 23, 25 can communicate with each other and the elevator system 2 comprising a new safety circuit 25 may be operated safely again.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 2 elevator system
3 tension member
4 hoistway
5 drive
6 elevator car
7a landing control panel
7b car operation panel
8 landing
10 landing door
11 elevator car door
12 interior space of the elevator car
16 floor of the elevator car
17 sidewall of the elevator car
19 position sensor
20 controller
21, 22, 23, 24, 25 security circuits
21a, 22a, 23a, 24a, 25a memory
21b, 22b, 23b, 24b (old) safety circuit security certificates
21c, 22c, 23c, 25c (new) safety circuit security certificates
21d, 22d, 23d, 24d, 25d communication interface
26 old factory security certificate
27 new factory security certificate
30 communicator
31 safety circuit interface
32 first data connection
33 server interface
34 second data connection
35 display
36 certification server
38 database
40 root security certificate

What is claimed is:

1. A method of updating a security certificate of a safety circuit of an elevator system, the method comprising:

connecting the safety circuit with a communicator, the communicator in communication with a certification server;

sending from the communicator to the safety circuit a security certificate update request for updating the security certificate stored within the safety circuit;

the safety circuit sending a public key of the security certificate stored within the safety circuit via the communicator to the certification server;

the certification server checking whether the security certificate associated with the public key is included in a database of known security certificates and not marked as compromised;

in case the security certificate associated with the public key is included in the database of known security certificates and not marked as compromised, sending a new security certificate from the certification server via the communicator to the safety circuit and installing the new security certificate on the safety circuit;

in case the security certificate associated with the public key (i) is not included in the database of known security certificates or (ii) is marked as compromised, sending a message from the certification server to the communicator indicating that the safety circuit is invalid.

2. The method according to claim 1, wherein the safety circuit checks whether the security certificate update request is valid before sending the public key of the security certificate, by checking whether the security certificate update request is signed with a valid security certificate.

3. The method according to claim 1, wherein the new security certificate sent from the certification server to the safety circuit includes a factory security certificate and a safety circuit security certificate signed with the factory security certificate.

4. The method according to claim 3 wherein the new security certificate sent from the certification server to the safety circuit replaces the security certificate stored within the safety circuit.

5. The method according to claim 4, wherein the factory security certificate is signed with a common root security certificate.

6. The method according to claim 5, wherein the security certificate update request is also signed with the common root security certificate.

7. The method according to claim 1, wherein the communication between the safety circuit and the communicator is encrypted.

8. The method according to claim 1, wherein the communication between the communicator and the certification server is encrypted.

9. A communicator for updating a security certificate stored within a safety circuit of an elevator system, the communicator comprising:

a safety circuit interface configured for exchanging data with the safety circuit of the elevator system; and a server interface configured for exchanging data with a certification server;

the communicator being configured for:

establishing a first data connection with the safety circuit of the elevator system via the safety circuit interface;

establishing a second data connection with the certification server via the server interface;

sending, to the safety circuit, a security certificate update request for updating the security certificate stored within the safety circuit;

receiving, from the safety circuit, a public key of the security certificate associated with the safety circuit and sending the public key of the security certificate to the certification server;

receiving, from the certification server, a new security certificate, and sending the new security certificate to the safety circuit; or receiving, from the certification server, a message that the safety circuit is invalid;

the safety circuit installing the new security certificate;

wherein the certification server checks whether the security certificate associated with the public key is included in a database of known security certificates and not marked as compromised;

wherein the certification server sends the new security certificate to the communicator when the security certificate associated with the public key is included in the database of known security certificates and not marked as compromised;

wherein the certification server sends the message when the security certificate associated with the public key (i) is not included in the database of known security certificates or (ii) is marked as compromised.

10. The communicator according to claim 9, wherein the communicator is configured for indicating whether the safety circuit is valid or not.

11. The communicator according to claim 9, wherein the communicator is a handheld device and/or comprises a display.

12. The communicator according to claim 9, wherein the safety circuit interface is configured for establishing a wired or wireless data connection with the safety circuit.

13. The communicator according to claim 9, wherein the server interface is configured for establishing a wired or wireless data connection with the certification server.

* * * * *